United States Patent [19]

O'Rourke et al.

[11] Patent Number: 5,731,813
[45] Date of Patent: *Mar. 24, 1998

[54] GRAPHICAL USER INTERFACE FOR GRAPHICALLY REPRESENTING, ORGANIZING, AND SELECTING APPLICATION PROGRAMS AND DOCUMENTS

[75] Inventors: Thomas C. O'Rourke; Brian T. O'Neill, both of Seattle; Rodney C. Cook, Edmonds; Kuntay O. Taner, Everett; Steven P. Snyder, Maple Valley; Adam R. Joyner, Seattle, all of Wash.

[73] Assignee: Ark Interface II, Inc., Seattle, Wash.

[*] Notice: The portion of the term of this patent subsequent to Sep. 20, 2011, has been disclaimed.

[21] Appl. No.: 254,602

[22] Filed: Jun. 6, 1994

Related U.S. Application Data

[63] Continuation of Ser. No. 786,291, Nov. 1, 1991, Pat. No. 5,349,658.
[51] Int. Cl.⁶ ............................................. G06F 3/14
[52] U.S. Cl. ..................... 345/349; 345/356; 345/351; 345/339; 395/682
[58] Field of Search ......................... 395/161, 155, 395/157, 159, 160, 156, 145, 146, 349–351, 348, 339, 346, 354, 356, 357, 776–778, 792, 680, 682

[56] References Cited

U.S. PATENT DOCUMENTS

| | | | |
|---|---|---|---|
| 4,663,615 | 5/1987 | Hernandez et al. | 395/777 X |
| 4,807,142 | 2/1989 | Agarwal | 395/792 X |
| 4,962,475 | 10/1990 | Hernandez et al. | 395/777 |
| 5,060,135 | 10/1991 | Levine et al. | 395/351 |
| 5,072,412 | 12/1991 | Henderson, Jr. et al. | 395/346 |
| 5,120,944 | 6/1992 | Kern et al. | 395/346 X |
| 5,210,824 | 5/1993 | Putz et al. | 395/778 X |
| 5,231,578 | 7/1993 | Levin et al. | 395/773 |
| 5,337,402 | 8/1994 | Kitagawa et al. | 395/349 X |
| 5,442,795 | 8/1995 | Levine et al. | 395/348 |
| 5,448,739 | 9/1995 | Jacobson | 395/680 |
| 5,465,327 | 11/1995 | Wang et al. | 395/349 X |
| 5,479,602 | 12/1995 | Baecker et al. | 395/349 |
| 5,504,852 | 4/1996 | Thompson-Rohrlich | 395/348 |
| 5,625,833 | 4/1997 | Levine et al. | 395/507 |

*Primary Examiner*—Raymond J. Bayerl
*Attorney, Agent, or Firm*—Wilson Sonsini Goodrich & Rosati

[57] ABSTRACT

A graphical user interface for a computer system that includes a memory for storing application programs and application files. The user interface permits the user to initiate execution of a selected application program, and produces a snapshot that graphically represents a screen produced during the execution of the application program. The snapshot may be displayed after execution of the application program is terminated, and provides a visual reference for the application file that was opened when the snapshot was taken. Snapshots and their corresponding application files may be organized in a project format, and new documents opened by an application program may be automatically placed in the opened project. The user interface provides an improved technique for initiating execution of application programs.

40 Claims, 9 Drawing Sheets

GRAPHICAL USER INTERFACE FOR GRAPHICALLY REPRESENTING, ORGANIZING, AND SELECTING APPLICATION PROGRAMS AND DOCUMENTS

This is a continuation of the prior application Ser. No. 07/786,291, filed Nov. 1, 1991 now U.S. Pat. No. 5,349,652, the benefit of the filing dates of which are hereby claimed under 35 USC 120.

The present invention relates to computer systems and, in particular, to a graphical user interface for a computer.

BACKGROUND OF THE INVENTION

Graphical user interfaces have become an increasingly common feature of computers, and in particular of personal computers. Such interfaces are provided either as built-in portions of the computer operating system, as in the case of the Macintosh computer available from Apple Computer Corporation, or as add-on software products that can be purchased separately from the underlying operating system, as in the case of the Windows 3.0 system available from Microsoft Corporation.

One of the many useful features provided by graphical user interfaces is the ability to initiate execution of other programs, usually referred to as "application programs," or simply as "applications." Examples of application programs are spreadsheets, word processing programs, database programs, etc. The process of initiating execution of an application program is typically handled through the use of small graphical symbols known as icons. The graphical user interface displays the icons on the computer screen, one icon for each application program that can be run. The user initiates execution of an application program by selecting the corresponding icon, most often using a pointing device such as a mouse.

Most graphical user interfaces permit the user to create an association between an application program and a selected application file. For example, in a word processing system, an application file might be a particular document created through use of the word processing system. In general, the terms "application file" and "document" are synonymous for purposes of the present description. When an association has been created, initiation of execution of the application program automatically causes the application program to load the associated document. This association may also work in reverse, such that selection by the user of a particular document causes the associated application program to be loaded and run with that document.

The conventional graphical user interfaces described above significantly reduce the amount of information that a user must recall in order to effectively use the computer. For example, instead of remembering the name of an application program, and the location of the program on a particular disk and within a given folder or directory, the user need only remember that a particular icon is associated with the application program. However, this simplification generally does not extend, to the same extent, to documents created by application programs. That is, a user must in general remember the file name assigned to a given document to cause that document to be loaded, either from the graphical user interface or from the application itself.

To address this problem, a number of software products have recently become available that permit designated graphical symbols (similar to icons) to be associated with particular documents. However, existing products of this type have a number of significant limitations. For example, some such systems require the user to create an icon for each document, a potentially time consuming task. Other systems provide for automatic icon creation based upon the contents of the document itself. However, these products work only for particular types of documents, i.e., for documents created by particular applications. There is a need for a technique for permitting visual cataloging of documents that can be used for all documents, regardless of their internal format.

SUMMARY OF THE INVENTION

The present invention provides a graphical user interface for a computer that greatly enhances the ability of a user to organize work on the computer. The graphical user interface also provides a solution to the document cataloging problem described above. The solution comprises making "snapshots" of the computer screen when documents are loaded, and later using the snapshots as visual references for the documents. Documents and their snapshots may be organized in a project format that greatly enhances the ability of the computer user to organize work.

In one aspect, the present invention operates in a computer system that includes a display, and means for enabling a user to generate a selection signal. The computer system also includes memory means for storing application programs and application files. In this system, the graphical user interface of the present invention includes means for permitting the user to initiate execution of a selected application program, and snapshot means for producing a snapshot that graphically represents a screen produced during execution of the application program. The user interface aim provides means for displaying the snapshot on the display after execution of the application program has terminated. The snapshot is preferably a reduced-scale image of one of the screens produced during execution of the application program.

Typically, the application program is one that permits the user to open and close application files, and the snapshot means preferably produces a snapshot when an application file is closed, such that the snapshot represents a screen produced when the application file was open. A snapshot of an open document may also be produced when the application program returns control to the graphical user interface, without first closing the document.

In a further preferred embodiment, the graphical user interface includes means for creating a data structure identifying a plurality of projects, each project having associated with it one or more application files and the snapshots corresponding to those application files. Means may also be provided for simultaneously displaying a plurality of snapshots associated with a project, and automatic timekeeping means for keeping track of the amount of time that a project is open.

Other significant features of the graphical user interface include the ability to group application programs into binders. A default application program and a tool icon may also be associated with each binder, and the tool icon may be positioned on a main display screen. When so positioned, the default program can be executed directly by selecting the appropriate tool.

DETAILED DESCRIPTION OF THE PREFERRED EMBODIMENT

Figure 1:
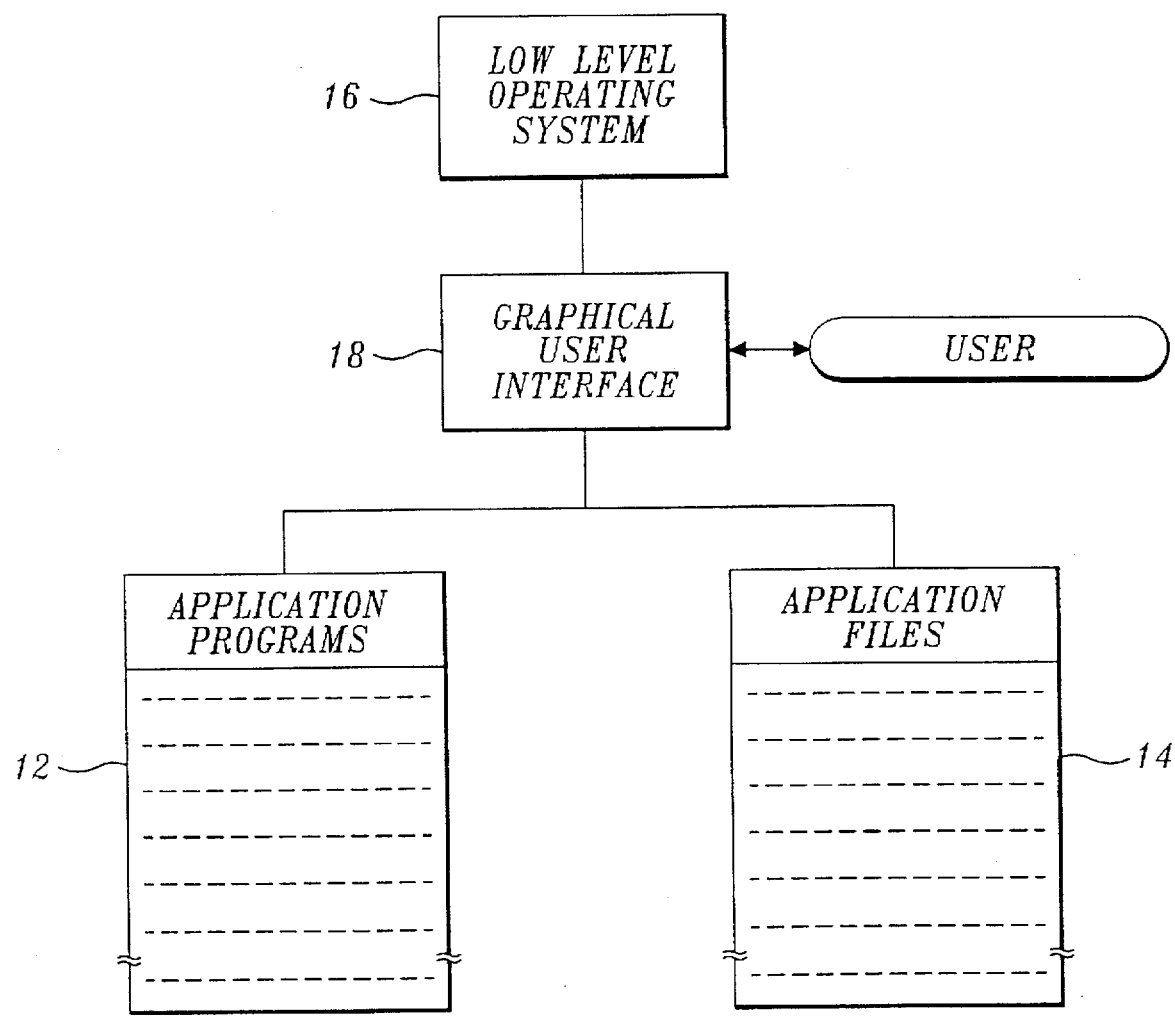
FIG. 1 is a chart illustrating the role of a graphical user interface in a computer system.

The general role of a graphical user interface in a computer system is illustrated in FIG. 1. The computer system includes a plurality of application programs 12, a plurality of application files or documents 14, and a basic or low-level operating system 16. In this environment, graphical user interface 18 provides a convenient method for allowing a user to manage the application programs and files, initiate execution of application programs, create associations between application programs and files, etc.

Figure 2:
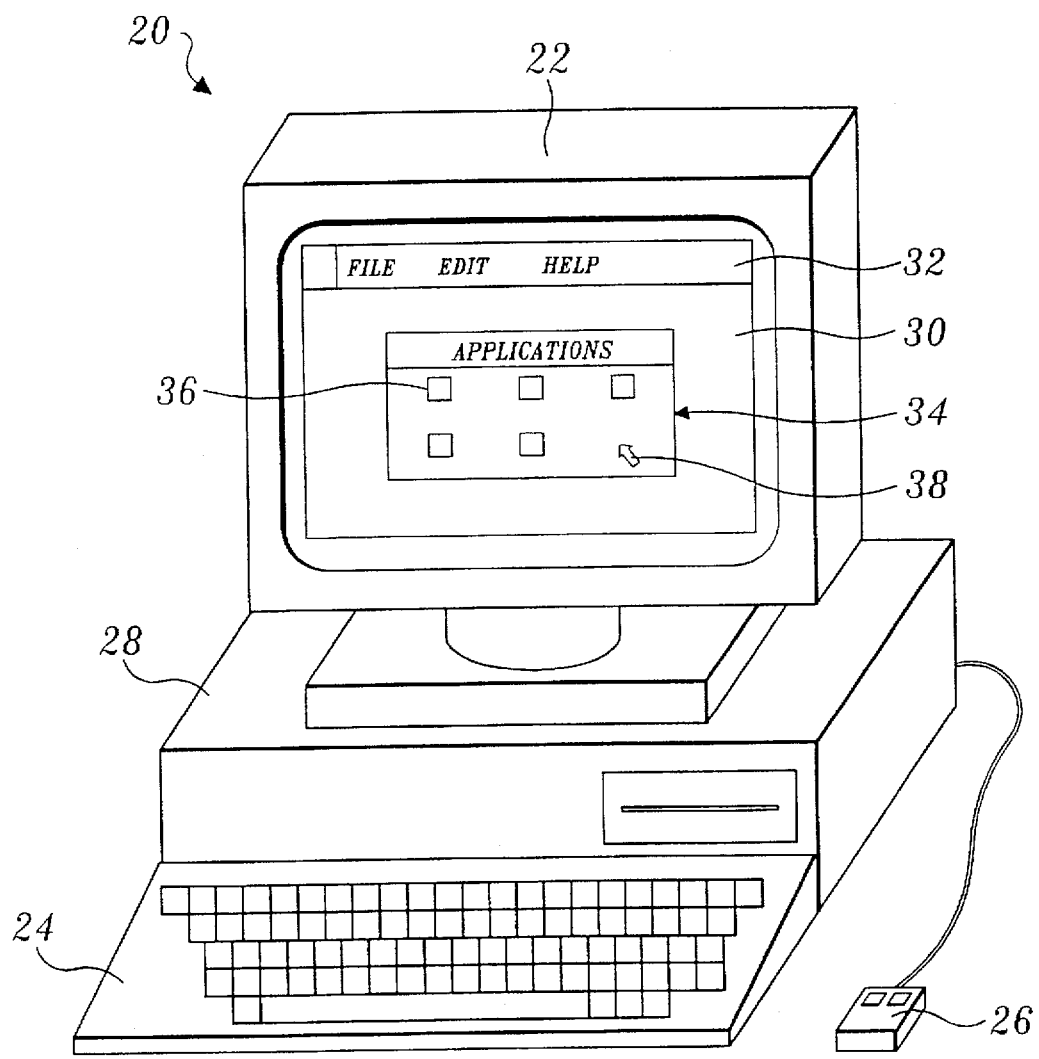
FIG. 2 schematically illustrates a computer utilizing a prior art type of graphical user interface.

FIG. 2 schematically illustrates a computer system that includes a prior art type of graphical user interface. The computer system 20 comprises a display or monitor 22, a keyboard 24, a mouse 26, and a main unit 28 that includes conventional disk and random access memory for storing the programs and fries depicted in FIG. 1. Monitor 22 includes a screen 30 on which elements of the graphical user interface are displayed. Such elements include menu bar 32, window 34, and graphics cursor 38. The name of the illustrated window is "Applications", and the window includes five icons 36, each of which may represent an application program.

In order to initiate execution of one of the application programs, the user manipulates cursor 38 using the mouse, such that the cursor is positioned over the desired icon. The user then selects the icon by performing a predetermined operation, for example double clicking, using the mouse. Later, when the execution of the application program terminates, the application program may return control to the graphical user interface. When that occurs, a computer screen of the type shown in FIG. 2 will be redisplayed, ready for the user's next selection or command.

Figure 3:
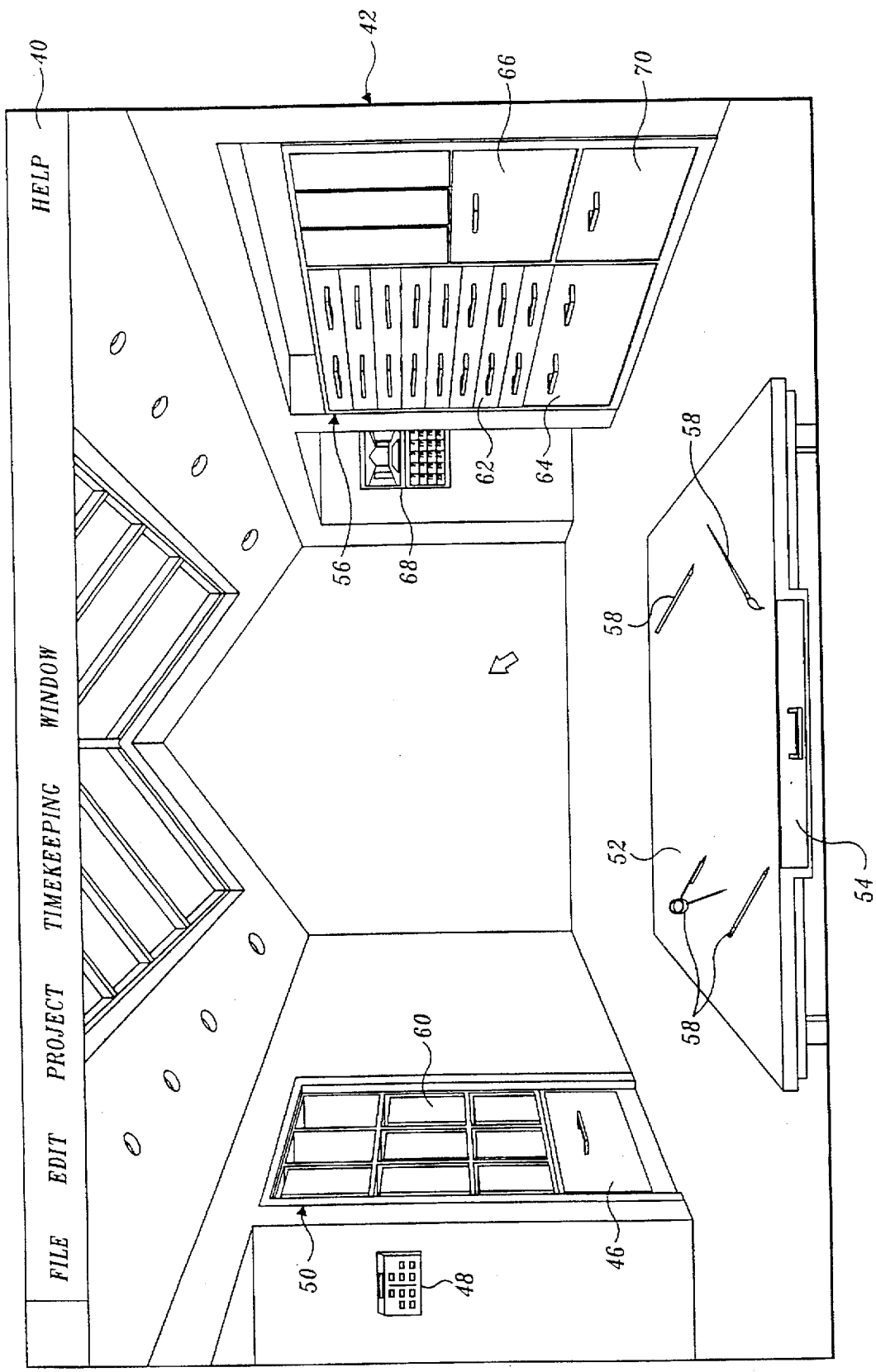
FIG. 3 illustrates one preferred embodiment for the main screen of the graphical user interface of the present invention.

In one preferred embodiment, the graphical user interface of the present invention produces a "main" screen display of the type illustrated in FIG. 3. The main screen includes a menu bar 40, and a workspace image 42 that occupies most of the screen. Workspace image 42 includes a number of areas with which particular functions are associated. These areas include setup area 46, preferences area 48, binder area 50, work surface 52, new project area 54, existing project area 56 and timekeeping area 68. In the example shown in FIG. 3, four tools 58 are positioned on work surface 52. The remaining portions of workspace image 42 are not associated with particular computer functions. Preferably, however, these remaining portions serve to create a realistic, three-dimensional image of a working environment, to thereby provide a system in which a user can quickly come to regard the interface as a natural extension of his or her actual workspace.

Most of the functional areas of the main screen will be discussed in detail below. However, in summary, binder area 50 comprises a plurality of individual binders 60, each of which can be thought of as containing a group of application programs. By using a setup function associated with setup area 46, a user may group application programs into binders when the graphical user interface is run for the first time, or may later reorganize the initial grouping. Each tool 58 on work surface 52 represents a particular application program, typically an application program that is frequently used.

Project area 56 comprises a plurality of small file drawers 62, each of which may be thought of as containing a "project" consisting of a group of application files or documents. New project area 54 is used to cream a new project that will subsequently be "stored" in project area 56. Timekeeping area 68 accesses a timekeeping function that, for example, automatically keeps track of the length of time that the user spends working on each project. Finally, preferences area 48 allows the user to make selections that control the appearance or operation of the graphical user interface. For example, the user may have the option of selecting different background images for the main screen shown in FIG. 3. Other examples of preferences are described below.

As indicated above, in the preferred embodiment illustrated in FIG. 3, a user's application programs are grouped into categories, referred to as "binders." The categorization step is pan of the setup process that is run when the user selects setup area 46 on the main screen. This is typically done the first time that the graphical user interface is run, and may subsequently be repeated to change the grouping. Preferably, the way in which application programs are grouped into binders is completely at the discretion of the user. During setup, the user may also select one of the application programs in each binder to be the "default" application for that binder, and selects a name and a tool icon for the binder. The significance of the default application and the tool icon are described below.

Figure 4:
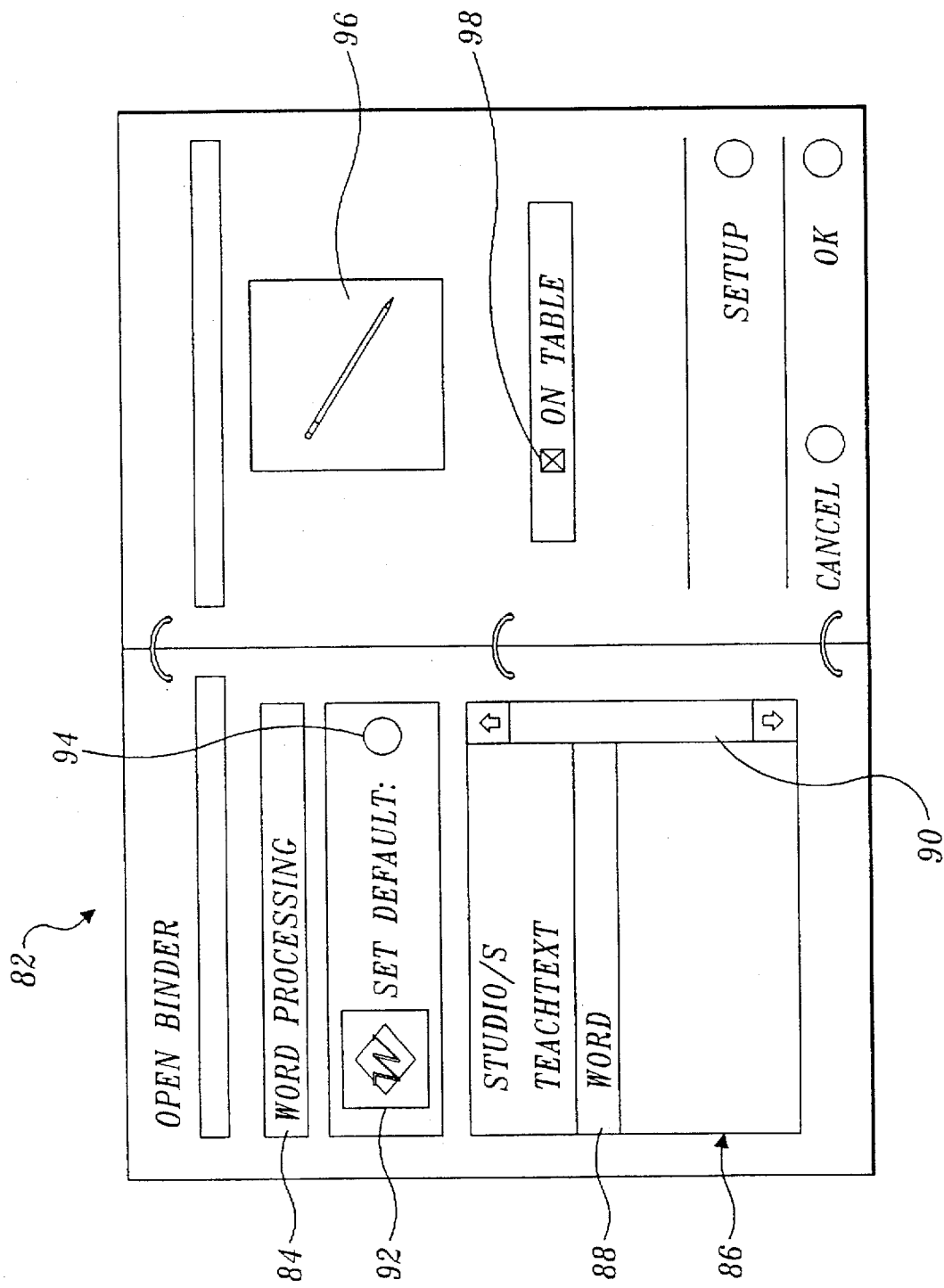
FIG. 4 illustrates the open binder screen.

Once setup has been run, a user may open a particular binder by double clicking on the associated binder area 60. In response, the interface program displays the "open binder" screen 82 shown in FIG. 4. Open binder screen 82 may occupy the entire display, or it may appear in a window overlying the main screen. Open binder screen 82 displays the name of the selected binder ("WORD PROCESSING" in this example) in binder name area 84, and lists the application programs that have been placed in this binder in list box 86. A particular application program 88 in the list box is highlighted. The position of the highlight can be changed using the mouse or the keyboard, in a conventional manner. The listed application programs can also be scrolled in a conventional manner, using scroll bar 90.

The left-hand side of open binder screen 82 also includes icon area 92 and set default button 94. Icon area 92 contains the icon of the highlighted application program 88. This icon is fully analogous to icons 36 shown in FIG. 2, and is typically provided with the application program. Set default button 94 is used to select one of the application programs in the binder as the "default" application for that binder. An application is selected as the default for the binder by first highlighting the application within list box 86, and then clicking on set default button 94 using the mouse. A bullet or other marker (not shown) may be placed next to the default application, to provide a visual cue as to the identity of the default program.

Preferably, the graphical user interface of the present invention provides a set of special icons, referred to as tools, that simplify the process of executing application programs. When a particular binder is created (e.g., during setup), the user is asked to select a particular tool icon for association with that binder. In the example shown in FIG. 4, the user has selected a pencil icon as the tool for the word processing binder. When this has been done, tool area 96 on the open binder screen displays the tool. Note that tools are associated with binders, while the application icons displayed in area 92 are associated with individual application programs. The tool associated with a binder may be positioned on work surface 52 (FIG. 3), by clicking on the "on table" button 98 on the open binder screen. This button operates as a toggle, so that a user can alternately place the tool on the work surface, or remove it from the work surface. In the example shown in FIG. 3, four tools 58 have been positioned on work surface 52.

When a default application has been selected for a binder, and when the tool representing that binder has been positioned on the work surface, the default application program for the binder can be executed from the main screen simply by selecting the tool, for example, by double clicking on it. In contrast, in a conventional graphical user interface, selecting a symbol that is associated with a group of application programs brings up a display of the icons of individual programs in the group. The present invention permits this intermediate step to be bypassed, thereby simplifying and streamlining the interface for frequently used applications. Preferably, the graphical user interface of the present invention also includes the feature that single clicking on a tool produces a temporary display showing the name of the default application program for the associated binder.

To permit the running of nondefault application programs, the graphical user interface preferably includes a feature whereby a given application program can be initiated by double clicking on the name of the application program in list box 86. This is a conventional feature found in a number of graphical user interfaces. Further options may also be provided. For example, the graphical user interface may provide that single clicking on a binder area 60 on the main screen produces the open binder screen for that binder, while double clicking on the binder area runs the default application for that binder.

An important function provided by the graphical user interface of the present invention is the efficient management of the documents. This management is accomplished by establishing projects into which the documents are placed, much as application programs are placed in binders. The definition of projects and the documents they contain is made by way of a data structure that is maintained by the graphical user interface. In a preferred embodiment, the data structure takes the form of project data structure 120 shown in FIG. 5. The illustrated project data structure includes seven columns or fields 121–127. Field 121 contains the project name, i.e., an identifier assigned by the user when the project is initially created. Fields 122 and 123 specify the client with whom the project is associated (if any), and the computer user for the project. The user field could be multi-element, for example, in a network implementation. The data for fields 121–123 is supplied by the user when a project is first created via new project area 54 shown in FIG. 3. The remaining fields are automatically maintained by the graphical user interface.

Time field 124 contains a cumulative total of the amount of time that the user has worked on the project since the project was initially created, or since the time field was reset, for embodiments in which a reset option is provided. This time is automatically maintained by the graphical user interface, by monitoring the elapsed time from when a project is opened by a user, until the project is later closed by the user. Methods by which the user opens and closes projects are described below. The graphical user interface preferably also includes an activity monitor that suspends the accumulation of time whenever the keyboard and mouse have been inactive for a prescribed period of time. The suspension is lifted when the next keystroke or mouse action is detected. Thus, the accumulated time more closely represents time actually working on the computer. Preferably, this prescribed period of time may be adjusted via preferences area 48 (FIG. 3).

Field 125 contains the names, i.e., the operating system file names, for documents associated with the project. Field 126 contains the names of the application programs that were used to create the respective documents. Thus, DOC 1 was created by the application WORD PROCESSOR, DOC 2 by SPREADSHEET, etc. In the Macintosh operating system, each application program has a unique four-letter identifier, and these identifiers may be used for application program field 126.

Field 127 contains snapshots associated with each of the documents in a project. In a preferred embodiment, the snapshot of a document is a condensed image of the actual computer screen, in the document window, at the time that the document was last closed, or at the time that the application program was closed with the document opened. The process for making snapshots is described below. Because the snapshots are condensed screen bit maps, they can be created for any document, regardless of the format in which the document is saved. The snapshots provide an extremely convenient way for retrieving a given document based upon its appearance, rather than upon a brief and often cryptic document or file name.

Referring again to FIG. 3, each small file drawer 62 in project area 56 may be associated with an existing project, i.e., a project that has been created and defined by the user via new project area 54. The user "opens" a project by clicking on the corresponding file drawer 62. Large file drawer 64 at the bottom left of project area 56 provides access to a "project browser" function, that essentially permits the user to review the project data structure of FIG. 5. The project browser is further discussed below. Large file drawer 66 in the project area preferably provides the ability to add files manually to existing projects, while large file drawer 70 is a catchall "project" that provides temporary storage for documents deleted from a project, or documents created when no project is open.

Opening a project by clicking on one of small file drawers 62 has two immediate consequences. First, the timekeeping function is activated, and the graphical user interface begins recording the amount of time that the given project has been open. Second, the graphical user interface displays the open project window 150 shown in FIG. 6. Preferably, the open project window does not fully cover or displace the main screen of FIG. 3, but rather occupies the portion of the main screen between binder area 50 and project area 56, above work surface 52.

The principal components of the open project window include project name area 152, snapshot area 154, and document list box 156 that includes scroll bar 158. Project name area 152 contains the name of the project (field 121 in FIG. 5) that the user selected from project area 56. List box 156 contains a list of the documents that have been placed in the project. In general, documents are placed in projects in one of two ways. The first way occurs when the user opens a project, launches an application program, and then creates a new document using the application program. The new document is automatically placed in the open project.

Second, the document control feature described below can be used to move documents from one project to another.

At any given time, a particular document 160 in the list box is highlighted, and snapshot area 154 contains the snapshot corresponding to the highlighted document. This snapshot corresponds to the appearance of the computer screen the last time that the user closed a window containing the document. Thus the snapshot provides a visual reminder of the contents of the highlighted document.

Other features of project window 150 include time display 170, time button 172, info 174, document control button 176, and document info button 188. Time display 170 displays the accumulated time for the project, i.e., the dam in time field 124 shown in FIG. 5. The graphical user interface preferably accumulates this time, by project, on a daily, weekly, or other suitable basis. Reports based upon such data can then be obtained through selection of timekeeping area 68 illustrated in the main screen of FIG. 3, or via selection of time button 172 shown in FIG. 6. In either case, the user can produce monthly or daily reports, as indicated in block 180. Thus, for a user who performs billable work primarily or exclusively using the computer, the graphical user interface provides a timekeeping function that can be used as the front end of a billing system.

Project info button 174 opens a dialog box for the currently opened project, while document info button 188 similarly opens a dialog box for the currently highlighted document in list box 156. Document control button 176 provides the function summarized in blocks 184–186. These functions permit the user to open a new project, to move or copy documents from one project to another, or to remove a document from a project, either permanently or to a holding bin. Overview button 162 brings up an overview screen that is discussed in more detail below. Close button 178 closes the currently open project. This causes open project window 150 to be removed from the screen, and terminates timekeeping for the open project.

Once a user has opened a project and caused the display of open project window 150, the user may resume work on a given document for that project by double clicking on the document name in list box 156, or on the document snapshot in snapshot area 154. When a document is selected in this manner, the graphical user interface loads (if necessary) the associated application program (field 126 in FIG. 5), and passes the application program the document name, so that the application program automatically opens the document ready for further work on that document by the user. After such work is done, the user will typically save the modified form of the document, and then either return to the graphical user interface, or begin execution of a different application program.

After the graphical user interface transfers control to an application program, the graphical user interface monitors execution of the application program, and of any further application programs to which the user transfers control. This monitoring is carried out for two reasons. First, the graphical user interface detects whenever the user opens a new document, and automatically places the document in the currently open project. Second, the graphical user interface detects whenever a document (new or preexisting) is closed, to create or update a snapshot for the document. A preferred technique for carrying out this monitoring is diagrammed in FIG. 7. In this Figure, reference numeral 200 designates the graphical user interface, reference numeral 202 designates the computer operating system, in this example the Macintosh operating system, and reference numeral 204 represents an application program.

Figure 5:
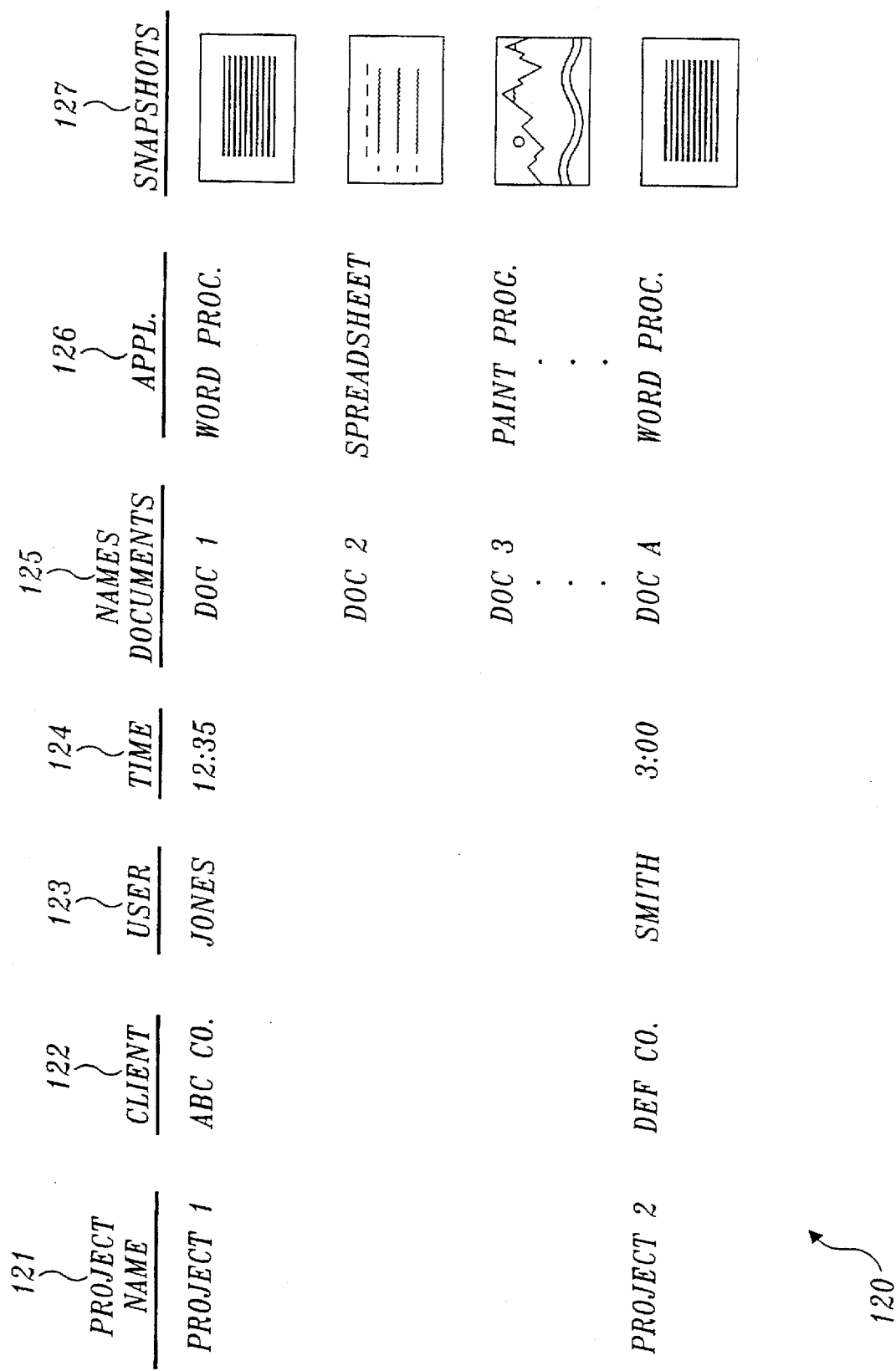
FIG. 5 is a chart illustrating the project data structure.

Graphical user interface 200 comprises project data structure 120 shown in greater detail in FIG. 5, project manager 206 that manages the project data structure and the open project window (FIG. 6), and snapshot module 208 that creates the snapshots. Five conventional modules of operating system 202 are shown in FIG. 7. These are file manager 211, new dialog module 212, close dialog module 213, close window module 214, and next event module 215. The operating system also includes local memory 220. Application program 204 makes use of modules 211–215 to perform the respective functions during execution of the application program. In accordance with the present invention, the function of monitoring application program execution is carried out by placing patches 221–225 into modules 211–215 respectively. A patch is a block of program code that is inserted into an operating system module, so that the patch is executed each time that the module is executed. Patches 221–225 function, as further described below, to permit the graphical user interface to maintain the project data structure while one or more application programs are running.

The operation of patches 221–225 can be described by tracing through an example. Assume that the user has opened a project, launched an application program, and opened a document within the application program. The opening of a document will be intercepted by the graphical user interface, as described below. However, for the moment, assume that the document has already been opened, and that the user now enters the appropriate selection or commands for closing the document. When application program 204 attempts to close the document, close window module 214 will be executed. In the Macintosh operating system, the close window module comprises the operating system module ShowHide. Execution of the close window module in turn causes execution of patch 224. In a preferred embodiment, patch 224 first determines if graphical user interface 200 is running, by looking for its name in the file control block. If it is not running, then the patch is exited. If it is running, then control is passed to snapshot module 208.

In a preferred embodiment, snapshot module 208 performs the following steps:

1. Determine if there is an open project. If not, no snapshot is taken.

2. If a project is open, check to see if a snapshot has been taken for the current event loop. To enable the snapshot module to make this decision, patch 225 is inserted into next event module 215 of the operating system. This check is made because close window module 214 could be called multiple times for the same window. In addition, multiple windows may be hidden in the same event loop cycle, but only the frontmost window will display information worth saving in a snapshot.

3. If Steps 1 and 2 are successful, determine the name of the document being closed, and determine if that document is included in the open project. If a match is found, then a screen snapshot is taken, and linked to the document in data structure 120 shown in FIG. 5. The snapshot module then returns control to patch 224, which in turn returns control to close window module 214.

In addition to monitoring the closing of documents, graphical user interface 200 also monitors the opening of documents, to detect when a new document has been created by a user. When a new document creation is detected, the document is added to the currently open project.

The detection of new documents is handled by patches 221–223. When a new document is to be saved by application program 204, file manager 211 is called, resulting in execution of patch 221. Patch 221 performs the following steps:

1. Reset a counter to keep track of nested dialog boxes, for reasons detailed below.
2. Check to see that graphical user interface 200 is running.
3. Receive from project manager 206 the information concerning the currently open project, and use this information to set the default folder.
4. Set a counter within local memory 220 equal to 1, indicating that patch 221 has been executed.
5. Get the address of the data record (SF Reply in the Macintosh operating system) that will be filled in by the user when the new document name is entered.

Patch 221 then terminates and returns control to file manager 211.

Patch 222 is used to keep track of nested dialog boxes. In particular, when patch 222 is executed during execution of the new dialog module, the counter that has been stored in local memory 220 is incremented by one. The purpose of this counter is described below.

Every time a dialog box is closed, close dialog module 213 is executed, resulting in the execution of patch 223. Patch 223 performs the following steps:

1. The counter stored in local memory 220 is checked. If this counter is not zero, then a nested dialog box is being closed, and patch 223 takes no further action. When the counter becomes zero, then the window of interest is being closed, and the subsequent steps are executed.
2. The existence of graphical user interface 200 is confirmed.
3. The patch checks to see that this operating system call is coming from the application program, rather than from the graphical user interface itself.
4. The document name is extracted from the SF Reply record. The document name is then passed back to project manager 206 of graphical user interface 200.

When project manager 206 receives the new document name from patch 223, it adds it to the project data structure for the currently open project.

While the above description has been tailored for the Macintosh operating system (running under Multifinder), the techniques can readily be adapted to other operating systems that permit running multiple applications at the same time. The basic requirement is that the graphical user interface be able to monitor the opening of new documents, and the closing of documents, so that the project data structure can be maintained. By way of example, in the Windows operating system available from Microsoft, graphical user interface 200 could use the SetWindowsHook routine to place needed commands and messages. When the filter traps a command or message to save or exit, the graphical user interface takes the steps outlined above to maintain the project data structure. The compression of screen images to snapshots under Windows can use the Stretch BLT function, and be stored as a compressed TIFF image, using the Bear River algorithms.

Figure 8:
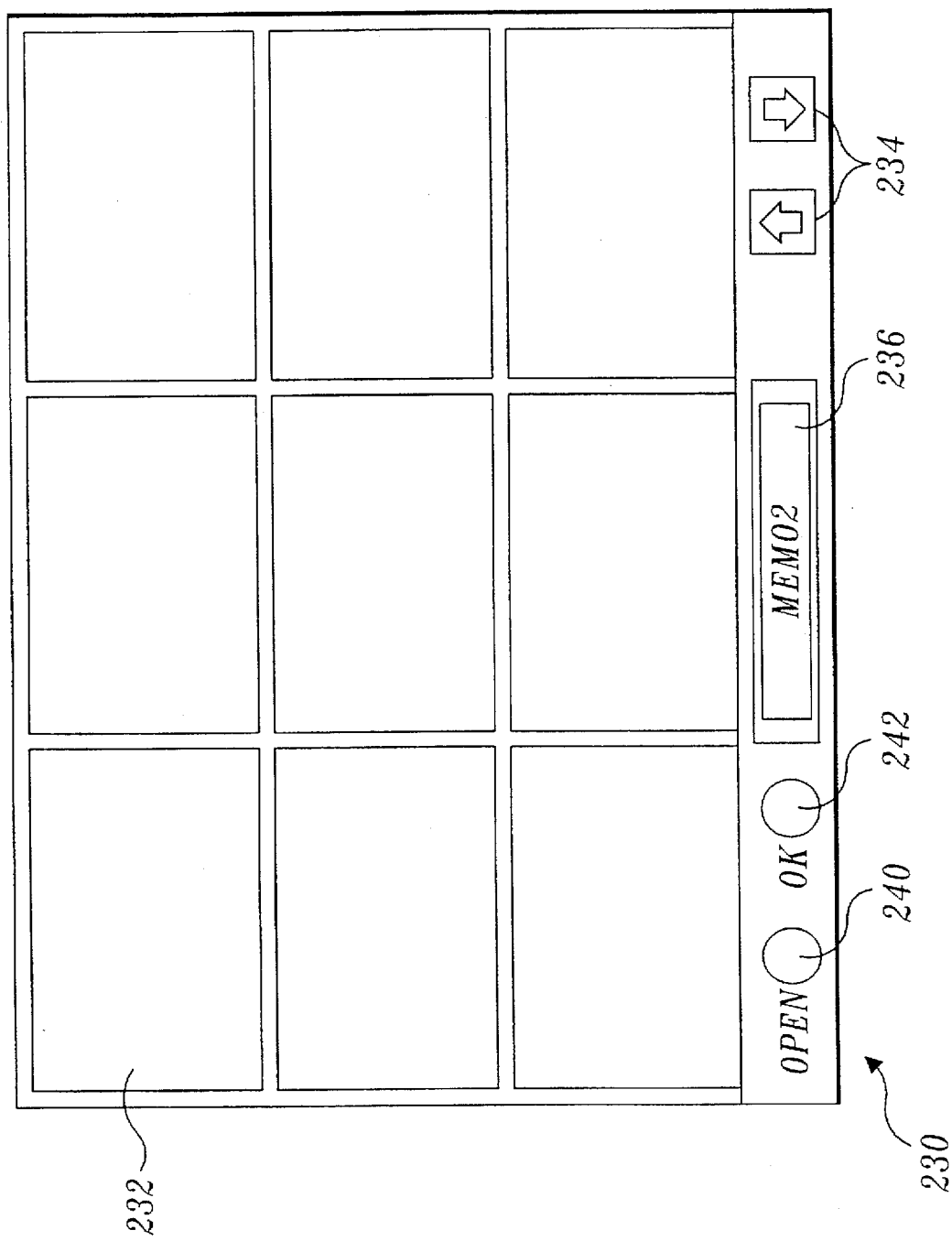
FIG. 8 illustrates the overview window.

Returning for the moment to FIG. 6, selection by the user of overview button 162 results in the display of overview screen 230 shown in FIG. 8. In the illustrated embodiment, the overview screen comprises nine snapshot areas 232, each snapshot area being for the display of the snapshot of one of the documents associated with the open project. If there are more than nine documents, scroll buttons 234 may be used to scroll through the snapshots in a vertical direction. At any given time, one of the snapshots is highlighted, for example using a high intensity outline, and the name of the highlighted document is displayed in document name box 236. Preferably, the user can change the highlighted snapshot by clicking on the desired snapshot. Other features of the overview screen include OK button 242 that is used to close the overview screen, and open button 240 that is used to initiate execution of the application program associated with the highlighted snapshot, with the corresponding document loaded.

Figure 9:
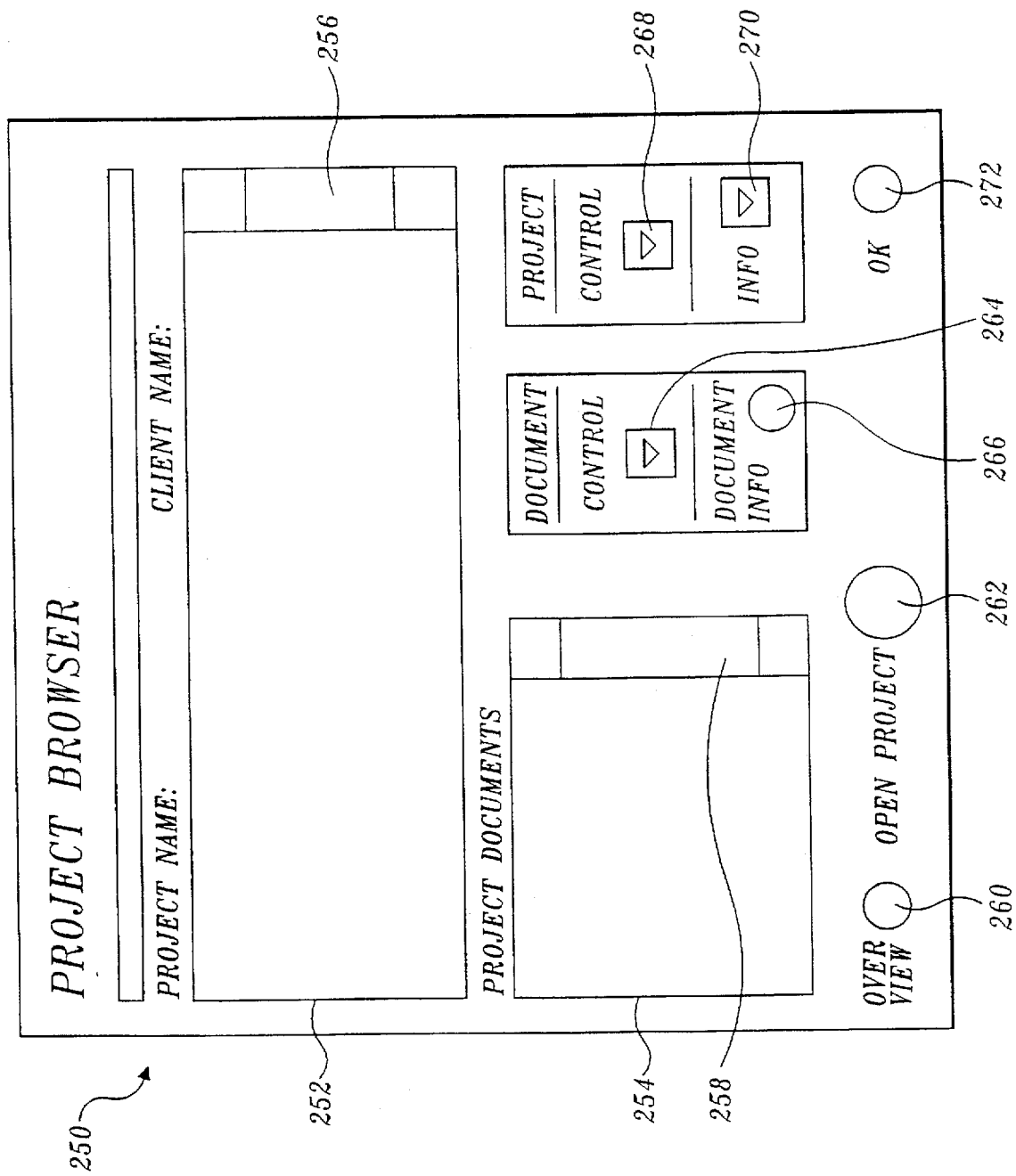
FIG. 9 illustrates the project browser window.

Referring again to FIG. 3, area 64 within existing project area 56 may provide a project "browser" function that permits the user to review projects that have been created. In a preferred embodiment, selection of large file drawer 64 results in the display of project browser screen 250 shown in FIG. 9. Project browser screen 250 includes project list area 252, document list area 254, and a list of controls described below. Project list area 252 lists the project name and client name fields of projects that have been created, with scroll bar 256 providing scrolling capability. At any given time, one of the projects within the project list area will be highlighted, and the documents corresponding to the highlighted project will be listed in document list area 254. These documents can also be scrolled using scroll bar 258.

Figure 6:
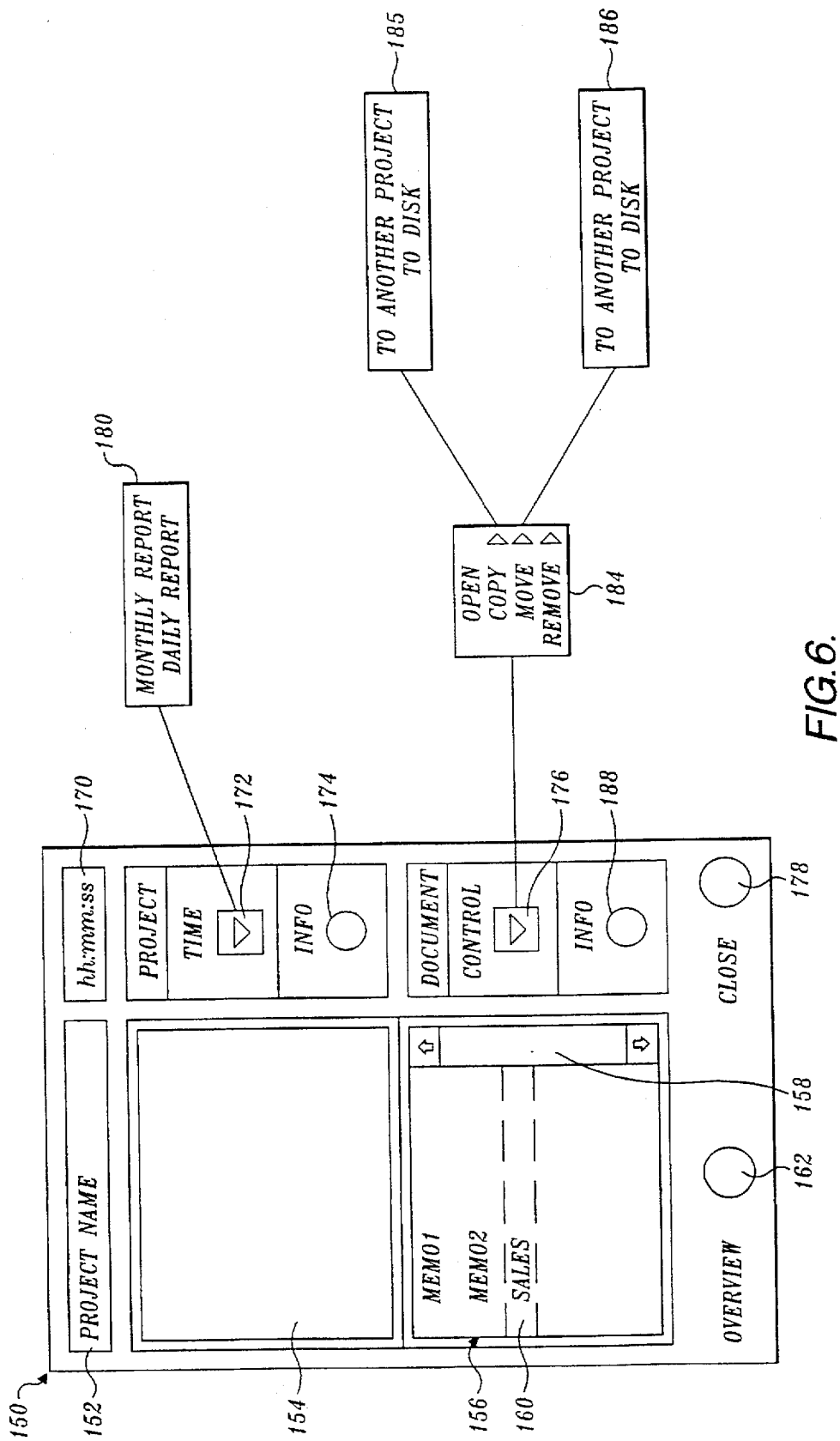
FIG. 6 illustrates the open project window.
Figure 7:
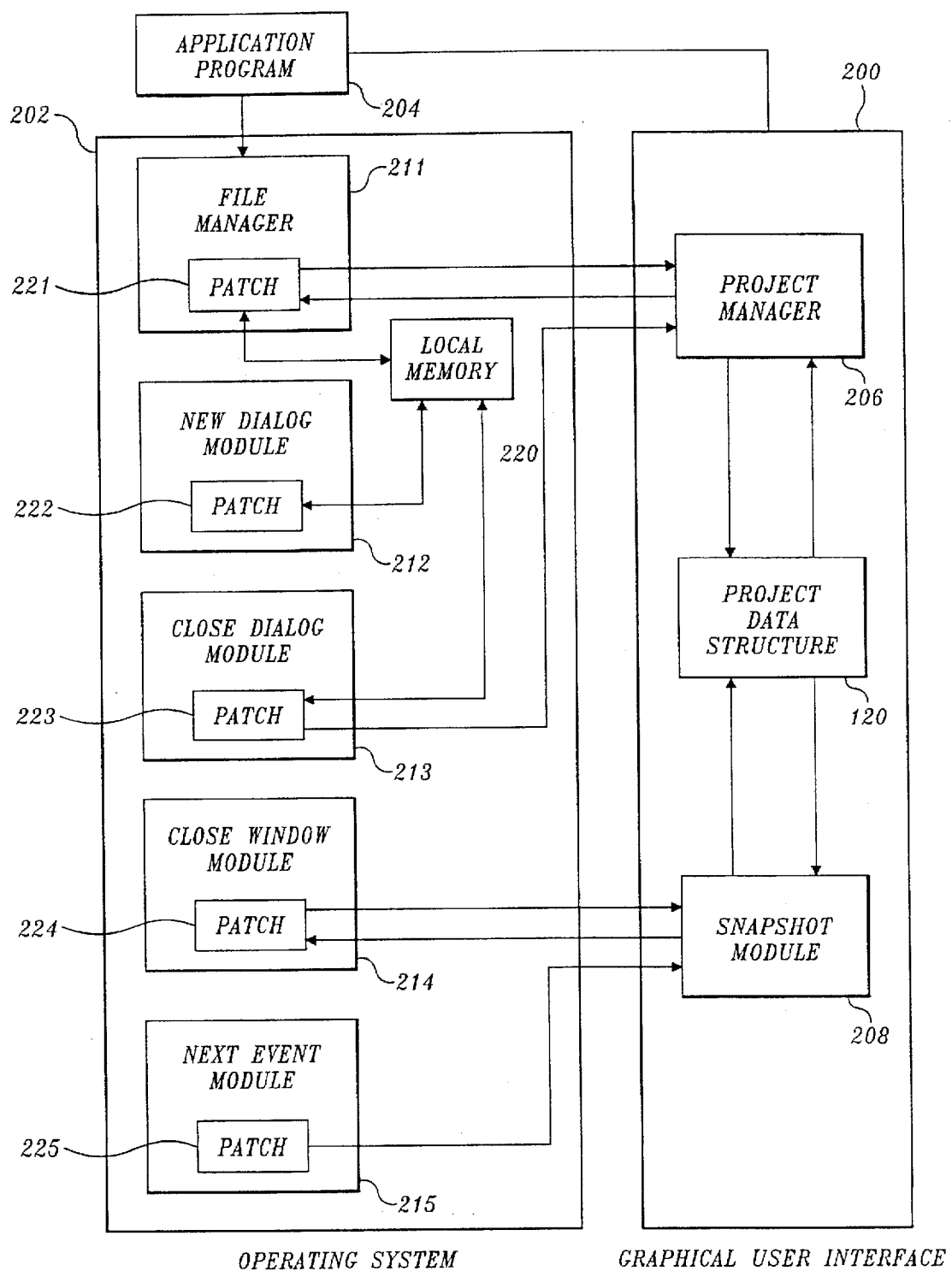
FIG. 7 is a diagram illustrating a technique whereby the graphical user interface monitors operating system calls made by an application program.

Controls on the project browser screen include overview button 260 that causes display of the overview screen shown in FIG. 8; open project button 262 that opens the currently highlighted project; document control button 264 that provides functions identical to those shown for control 176 in FIG. 6; document info button 266 that provides details concerning the currently highlighted document; project control button 268 that provides delete and open functions; project info button 270 that provides functions similar to those illustrated in block 180 in FIG. 6; and OK button 272 that closes the project browser window. In combination with the open project window of FIG. 6 and the overview window of FIG. 8, the project browser window provides the user with a set of powerful tools for managing application files.

It will be recognized by those skilled in the art that the description set forth above has included details that could be modified, or in some cases eliminated, without departing from the spirit and scope of the invention. It will also be appreciated that the description has focused on the novel aspects of the invention, without describing all features that would typically be included in a graphical user interface. For example, all or most of the user actions described above in connection with the various features of the graphical user interface can preferably also be carried out by means of menu bar 40 shown in FIG. 3. For these reasons, the above description is not to be taken in a limiting sense, and the scope of the present invention is instead defined by the following claims:

The embodiments of the invention in which an exclusive property or privilege is claimed are defined as follows:

1. In a computer user interface system including a display, a method of graphically representing a screen produced by an application program wherein the application program provides a document window for editing application data and stores or provides the application data in an internal format unknown to the computer user interface system, the method comprising the steps of:

allowing the application program to be executed such that the screen is produced on the display showing the application data in the document window;

automatically recording, separately from the application data and in a manner independent of the internal format, an image in an accessible format different from the internal format used by the application program, wherein the image is graphically representative of at least a portion of the screen showing the application data produced by the application program during execution of the application program;

terminating the execution of the application program such that the screen and the application data in the document window are no longer produced on the display; and accessing the recorded imaging in the accessible format and displaying the image on the display outside of the document window after execution of the application program has terminated without accessing the application data in the internal format.

2. The method of claim 1, wherein the image comprises a reduced-scale image of at least a portion of the screen produced by the application program during execution of the application program.

3. In a computer user interface system including a display, a method of graphically representing a screen produced by an application program wherein the application program provides a document window for editing application data and stores or provides application data in an internal format unknown to the computer user interface system, the method comprising the steps of:

executing the application program;

causing the screen showing the application data in the document window to be displayed by the application program on the display during execution of the application program;

automatically recording, in a manner independent of the internal format, a snapshot in an accessible format different from the internal format used by the application program, wherein the snapshot is graphically representative of the screen showing the application data produced by the application program during execution of the application program;

storing the snapshot separately from the application data;

terminating execution of the application program such that the screen and the application data in the document window are no longer produced on the display; and accessing the recorded snapshot in the accessible format and displaying the snapshot on the display outside of the document window after execution of the application program has terminated without accessing the application data in the internal format.

4. The method of claim 3, wherein the snapshot comprises a reduced-scale image of the screen produced by the application program during execution of the application program.

5. In a computer user interface system including a display, a method of graphically representing a document produced by an application program wherein the application program provides a document window for editing the document and stores or provides the document in an internal format unknown to the computer user interface system, the method comprising the steps of:

allowing the application program to be executed such that a screen of the document is produced on the display showing the document in the document window;

automatically recording, separately from the document and in a manner independent of the internal format, an image in an accessible format different from the internal format used by the application program, wherein the image is graphically representative of at least a portion of the screen of the document in the document window during execution of the application program;

terminating the execution of the application program such that the screen and the document in the document window are no longer produced on the display; and accessing the recorded image in the accessible format and displaying the image on the display outside of the document window after execution of the application program has terminated without accessing the document in the internal format.

6. The method of claim 5, wherein the image comprises a reduced-scale image of at least a portion of the screen of the document displayed by the application program.

7. The method of claim 5, wherein the image is recorded separately from the document such that the image may be displayed without accessing the document.

8. In a computer user interface system including a display, a method of graphically representing a document produced by an application program wherein the application program provides a document window for editing the document and stores or provides the document in an internal format unknown to the computer user interface system, the method comprising the steps of:

executing the application program;

causing a screen of the document to be displayed by the application program on the display showing the document in the document window during execution of the application program;

automatically recording, separately from the document and in a manner independent of the internal format, a snapshot in an accessible format different from the internal format used by the application program, wherein the snapshot is graphically representative of the screen of the document in the document window during execution of the application program;

terminating execution of the application program such that the screen and the document in the document window are no longer produced on the display; and accessing the snapshot in the accessible format and displaying the snapshot on the display outside of the document window after execution of the application program has terminated without accessing the document in the internal format.

9. The method of claim 8, wherein the snapshot comprises a reduced-scale image of the screen of the document displayed by the application program.

10. In a computer user interface system including a display, a method of graphically representing a document produced by an application program wherein the application program provides a document window for editing the document and stores or provides the document in an internal format unknown to the computer user interface system, the method comprising the steps of:

allowing the application program to be executed;

allowing the application program to open the document during execution of the application program and display at least one screen while the document is open in the document window;

automatically recording, in a memory separately from the document and in a manner independent of the internal format, a snapshot of the screen in an accessible format different from the internal format used by the application program;

closing the document such that the screen and the document in the document window are no longer displayed; and maintaining the snapshot in the memory after the document has been closed such that the snapshot may be accessed in the accessible format and displayed without accessing the document in the internal format.

11. The method of claim 10, wherein the step of automatically recording said snapshot further comprises the step of storing the snapshot in the memory in association with a reference to the document.

12. The method of claim 11, further comprising the step of:

creating a data structure in the memory for referencing a plurality of projects and for each project, one or more associated documents, and for each document, an associated snapshot;

and wherein said step of storing said snapshot further comprises the step of storing and associating said snapshot and said document in the data structure in association with at least one of said projects.

13. The method of claim 12, funher comprising the step of displaying a plurality of snapshots associated with a single project.

14. The method of claim 12, further comprising the steps of:

allowing a user to select a project and initiate execution of an application program in association with the project; and providing a measure of the period of time during which application programs associated with the project are executed.

15. The method of claim 11, further comprising the steps of:

displaying said snapshot on the display after execution of said application program has terminated;

allowing a user to select an image on the display;

initiating execution of the application program in response to selection by the user of said snapshot; and automatically causing said application program to open said document.

16. In a computer system including a display, a memory for storing one or more application programs and one or more documents, and a subdirectory file organizing system for locating documents in the memory, each application program permitting the user to create a document in a document window and place it in a file in a specified subdirectory, a method of associating documents with projects, the method comprising the steps of:

creating a data structure referencing a plurality of said projects and, for each project, a plurality of associated documents located in files in a plurality of different subdirectories;

enabling a user to select a project;

monitoring the execution of an application program to detect when a new document is created in the document window shown on the display and placed in a corresponding file in a subdirectory;

automatically associating the new document with the selected project in the data structure by incorporating a reference to the corresponding file into the data structure when the document is placed in the corresponding file;

terminating the execution of the application program such that the new document and the document window are no longer displayed; and using the data structure to generate a document listing for the selected project independent of the document window, wherein the document listing provides a list of references to the plurality of associated documents for the selected project, including the new document, which are selectable to access a desired document in the selected project.

17. The method of claim 16, further comprising the step of displaying a representation of all of the documents associated with the selected project.

18. The method of claim 17, further comprising the steps of:

associating each respective document with the application program used to cream said document;

allowing a user to select one of said representations;

initiating execution of the associated application program in response to selection by the user of one of said representations; and automatically causing said application program to open the respective document.

19. The method of claim 16, further comprising the step of measuring the period of time during which a project is opened.

20. In a computer system including a display, a memory for storing one or more application programs and one or more documents, and a subdirectory file organizing system for locating documents in the memory, each application program permitting the user to create a document in a document window and place it in a file in a specified subdirectory, a method of associating documents, the method comprising the steps of:

providing a data structure having a plurality of entries, each entry capable of referencing a plurality of associated documents located in files in a plurality of different subdirectories;

enabling a user to select an entry;

monitoring the execution of an application program to detect when a new document is created in a document window shown on the display and placed in a corresponding file in a subdirectory;

associating the new document with the selected entry by incorporating a reference to the corresponding file into the data structure when the document is placed in the corresponding file;

terminating the execution of the application program such that the new document and the document window are no longer displayed; and using the data structure to generate a document listing for the selected entry independent of the document window, wherein the document listing provides a list of references to the plurality of associated documents for the selected entry, including the new document, which are selectable to access a desired document associated with the selected entry.

21. A method for permitting a user to initiate execution of an application program, said method comprising the steps of:

enabling a user to control the position of a cursor on the display and to generate a selection signal;

providing a plurality of application programs wherein each of the application programs is capable of retrieving, editing and storing information in a defined format;

providing a data structure having an entry for each of the application programs;

grouping the application programs into a plurality of groups in said data structure based upon functional features of the application programs wherein each group contains more than one application program;

designating an application program in each group of application programs as the default application program for the group;

defining an area on the display for each group which represents the plurality of application programs in the respective group; and initiating execution of the default application program in response to the generation of a selection signal by the user while the cursor is anywhere within the area for the respective group.

22. The method of claim 21 further comprising the steps of:

displaying a representation of each application program in the group in response to the generation of a second selection signal by the user while the cursor is anywhere within the area; and allowing the user to select any of the application programs in the group for execution when the representation of each application program in the group is displayed.

23. In a user interface system for a computer, the computer including a memory for storing an application program and a plurality of documents, an operating system for providing a subdirectory file organizing system for locating the documents in the memory and for providing a system routine for closing the documents in the subdirectory file organizing system, the application program storing or providing the application data in an internal format unknown to the computer user interface system and being capable of closing a specified document by requesting execution of the system routine, a method of graphically representing the specified document comprising:

allowing the application program to be executed;

allowing the application program to open the specified document in a document window during execution of the application program and display at least one screen while the specified document is open in the document window;

intercepting execution of the application program after the application program requests execution of the system routine in order to close the specified document and prior to completion of the execution of the system routine;

recording a snapshot of the screen in the memory, separately from the specified document and in an accessible format different from the internal format used by the application program, during the interception of the execution of the application program such that the snapshot may be displayed without accessing the specified document in the internal format;

closing the specified document such that the screen and the document in the document window are no longer displayed; and accessing the recorded snapshot in the accessible format and displaying the snapshot after the specified document has been closed.

24. A computer user interface system comprising:

means for executing an application program;

means for allowing the application program to open a document in a document window during execution of the application program and display at least one screen while the document is open in the document window;

means for saving the document in a memory as a first file in an internal format of the application program;

means for automatically recording a snapshot of the screen during the execution of the application program in the memory as a second file in an accessible format different from the internal format separately from the first file such that the snapshot may be displayed without accessing the first file in the internal format;

means for closing the document such that the screen and the document in the document window are no longer displayed; and means for accessing the recorded snapshot in the accessible format and displaying the snapshot after the document has been closed without accessing the document in the internal format.

25. The computer user interface system of claim 24, further comprising:

means for displaying the snapshot after execution of the application program has terminated;

means for selecting the displayed snapshot;

means for initiating execution of the application program in response to the selection of the displayed snapshot; and means for automatically causing the application program to open the document.

26. A user interface system for a computer, the computer including a memory for storing an application program and a plurality of documents, an operating system for providing a subdirectory file organizing system for locating the documents in the memory and for providing a system routine for closing the documents in the subdirectory file organizing system, the application program storing or providing the application data in an internal format unknown to the user interface system and being capable of closing a specified document by requesting execution of the system routine, the user interface system comprising:

means for executing the application program;

means for allowing the application program to open the specified document in a document window during execution of the application program and display at least one screen while the specified document is open in the document window;

means for intercepting execution of the application program after the application program requests execution of the system routine in order to close the specified document and prior to completion of the execution of the system routine;

means for recording a snapshot of the screen in the memory, separately from the specified document and in an accessible format different from the internal format used by the application program, during the interception of the execution of the application program such that the snapshot may be displayed without accessing the specified document in the internal format;

means for closing the document such that the screen and the document in the document window are no longer displayed; and means for accessing the recorded snapshot in the accessible format and displaying the snapshot after the specified document has been closed.

27. The user interface system of claim 26 wherein the means for recording the snapshot further comprises:

means for determining whether the snapshot has been recorded for a current event loop; and means for recording the snapshot when the snapshot has not been recorded for the current event loop.

28. The user interface system of claim 26 wherein the means for intercepting execution of the application program comprises a patch to the system routine.

29. The user interface system of claim 26 wherein the means for intercepting execution of the application program comprises a filter for intercepting the request for execution of the system routine.

30. In a computer user interface system for a computer, the computer including a display, a memory for storing a plurality of application programs and a plurality of documents, an operating system for providing a subdirectory file organizing system for locating the documents in the memory and for providing a system routine for creating and placing new documents in files in the subdirectory file organizing system, each application program capable of creating a new document in a document window and placing it in a corresponding file in a specified subdirectory by requesting execution of the system routine, a method for associating the documents comprising the steps of:

providing a data structure specifying a plurality of projects;

providing at least one field in the data structure for each project, wherein each field is capable of storing a reference to an associated document located in a file in any subdirectory;

enabling a user to select a project;

executing a selected one of said plurality of application programs;

intercepting execution of the selected application program after the selected application program requests execution of the system routine in order to create the new document in the document window and place it in the corresponding file in the specified subdirectory and prior to completion of the execution of the system routine;

automatically storing a reference to the new document in the field for the selected project by obtaining a reference to the corresponding file during the interception of the execution of the selected application program and incorporating the reference to the corresponding file into the data structure, thereby associating the new document with the selected project;

terminating the execution of the application program such that the new document and the document window are no longer displayed; and using the data structure to generate a document listing for the selected project independent of the document window, wherein the document listing provides a list of references to the plurality of associated documents for the selected project, including the new document, which are selectable to access a desired document in the project.

31. A user interface system for a computer, the computer including a memory for storing a plurality of application programs and a plurality of documents, an operating system for providing a subdirectory file organizing system for locating the documents in the memory and for providing a system routine for creating and placing new documents in files in the subdirectory file organizing system, each application program capable of creating a new document in a document window and placing it in a corresponding file in a specified subdirectory by requesting execution of the system routine, the computer user interface system comprising:

a data structure formed within the memory specifying a plurality of projects;

means for providing at least one field in the data structure for each project, wherein each field is capable of storing a reference to an associated document located in a file in any subdirectory;

means for enabling a user to select a project;

means for executing a selected one of said plurality of application programs;

means for intercepting execution of the selected application program after the selected application program requests execution of the system routine in order to create the new document in the document window and place it in the corresponding file in the specified subdirectory and prior to completion of the execution of the system routine;

means for automatically storing a reference to the new document in the field for the selected project by obtaining a reference to the corresponding file during the interception of the execution of the selected application program and incorporating the reference to the corresponding file into the data structure, thereby associating the new document with the selected project;

terminating the execution of the application program such that the new document and the document window are no longer displayed: and using the data structure to generate a document listing for the selected project independent of the document window, wherein the document listing provides a list of references to the plurality of associated documents for the selected project, including the new document, which are selectable to access a desired document in the project.

32. The computer user interface system of claim 31 wherein the means for automatically storing the reference to the new document further comprises:

means for retrieving a reference to a field in a first dialog box;

means for tracking nested dialog boxes to determine when the first dialog box is closed; and means for retrieving a name for the new document from the field in the first dialog box.

33. The user interface system of claim 31 wherein the means for intercepting execution of the application program comprises a patch to the system routine.

34. The user interface system of claim 31 wherein the means for intercepting execution of the application program comprises a filter for intercepting the request for execution of the system routine.

35. The user interface system of claim 31, further comprising timer means for measuring a cumulative period of time that the selected project is selected by the user.

36. The user interface system of claim 35, further comprising means for resetting the timer means.

37. The user interface system of claim 35, further comprising means for automatically suspending the timer means in the absence of activity for a predetermined period of time.

38. A user interface system for a computer system including a memory, the user interface system comprising:

means for grouping application programs into a plurality of groups based upon functional features of the application programs by creating in the memory a table comprising a table entry for each of a plurality of application programs, wherein each group contains more than one application program;

means for designating an application program in each group of application programs as the default application program for the group;

for each group, means for defining an area on the display which represents the corresponding plurality of application programs; and means for initiating execution of the respective default application program in response to the generation of a first selection signal by the user while the cursor is anywhere within the area for the respective group;

means for displaying a representation of each application program in the respective group in response to the generation of a second selection signal by the user while the cursor is anywhere within the area for the respctive group; and means for allowing the user to select any of the application programs in the respective group for execution when the representation of each application program in the respective group is displayed.

39. In a computer user interface system including a display, a method of graphically representing a screen produced by an application program wherein the application program provides a document window for editing application data and stores or provides the application data in an internal format unknown to the computer user interface system, the method comprising the steps of:

allowing the application program to be executed such that the screen is produced on the display showing the application data in the document window:

automatically creating, in a manner independent of the internal format, an icon in an accessible format different from the internal format used by the application program, wherein the icon has the appearance of at least a portion of the screen showing the application data produced by the application program during execution of the application program;

storing the icon separately from the application data;

terminating execution of the application program such that the screen and the application data in the document window are no longer produced on the display; and accessing the icon in the accessible format and displaying the icon outside of the document window after execution of the application program has terminated without accessing the application data in the internal format.

40. The method of claim 39, wherein the icon comprises a reduced-scale image of at least a portion of the screen produced by the application program during execution of the application program.

* * * * *